Jan. 5, 1960 P. D. SAW 2,920,270
APPARATUS FOR DETECTING FLAWS IN PROTECTIVE COATINGS
Filed Aug. 15, 1958 2 Sheets-Sheet 2
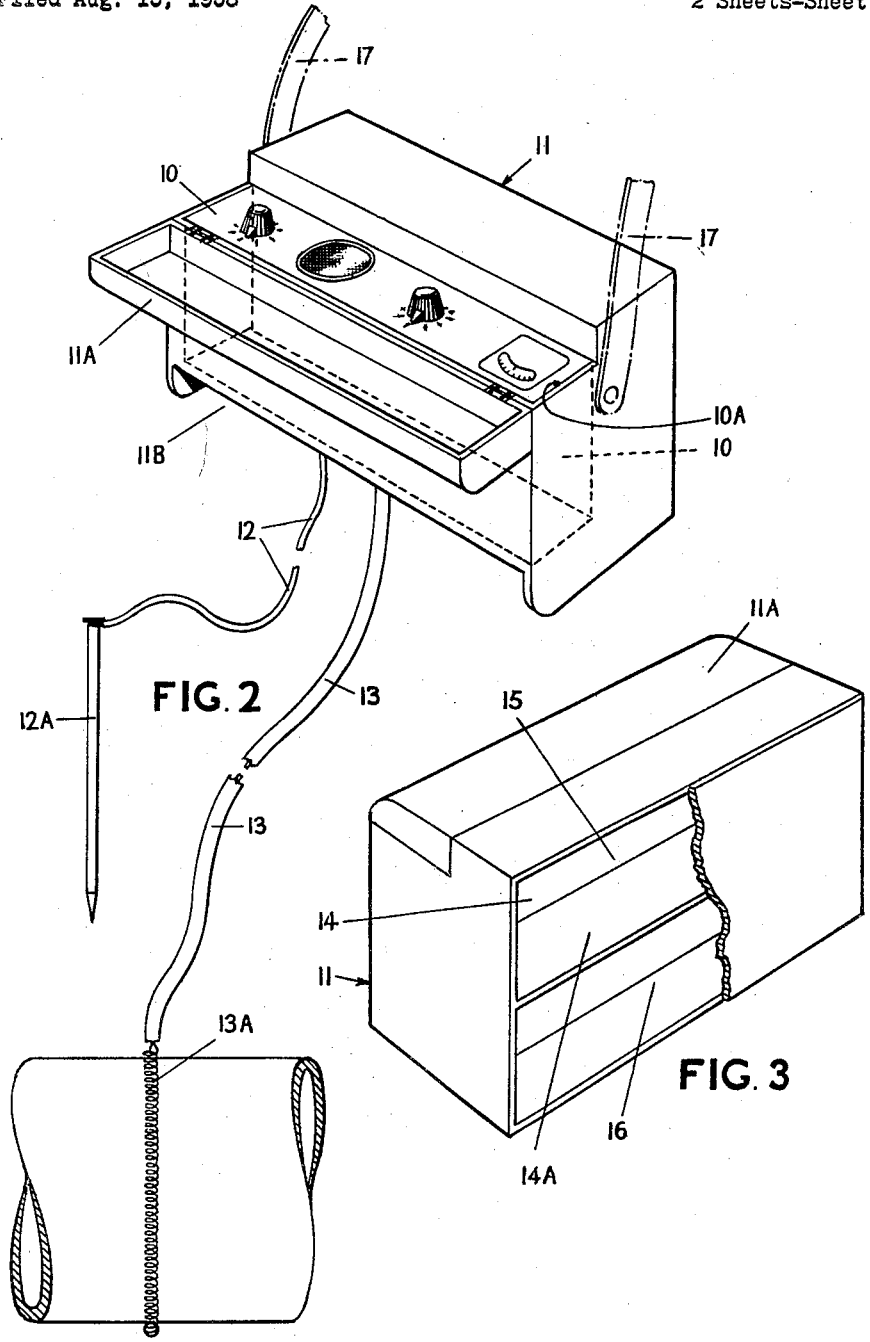

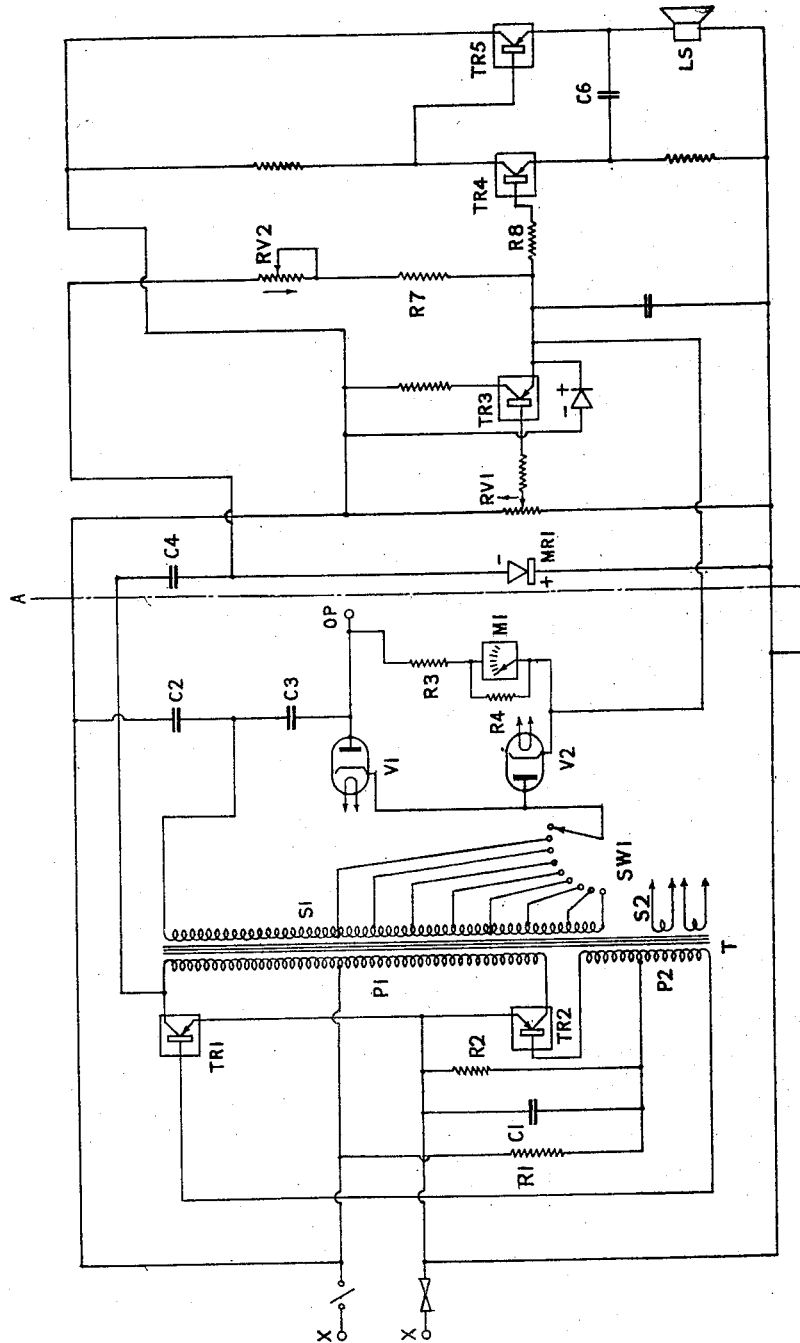
FIG. I

United States Patent Office 2,920,270
Patented Jan. 5, 1960

2,920,270

APPARATUS FOR DETECTING FLAWS IN PROTECTIVE COATINGS

Peter Dorée Saw, Staines, England, assignor, by mesne assignments, to Tyer and Company Limited, Guildford, England, a British company Application August 15, 1958, Serial No. 755,333

Claims priority, application Great Britain May 14, 1958

2 Claims. (Cl. 324—54)

This invention relates to the provision of apparatus for detecting flaws in protective coatings on pipes, conduits and the like.

One object of the invention is to provide a light weight, portable, high voltage insulation tester for detecting flaws (often called holidays) in coated pipes.

According to the present invention I provide apparatus of the kind described comprising means for generating high voltage direct current from a low voltage D.C. supply, means for applying the high voltage to the coating of a pipe or the like under test and means whereby the current flowing through a flaw in the coating may give an indication to the operator of the apparatus. It is preferred that an audible indicator be used since this gives a more definite indication than other forms of indicator.

In order to detect flaws in insulating coatings, voltages up to 20,000 may be necessary, and if the testing is required to be carried out over a fairly large area, as when testing the complete periphery of a large diameter pipe, then, due to the capacity effect, a direct current is more convenient to use than an alternating, or "spike" current, as the power required may be smaller when using D.C. This smaller power represents a reduction in battery size for portable equipment and reduced hazard to the operator from electric shock.

In order that the invention may be clearly understood, it will now be described more fully, by way of example, and with reference to the accompanying drawings, in which:

Figure 1 is a circuit diagram of the apparatus in accordance with the invention;

Figure 2 is a front perspective view of a portable case for the apparatus, and showing ancillary equipment and Figure 3 is a rear perspective view of the case showing compartments for batteries and other accessories.

Referring to Figure 1, that part of the diagram to the left hand side of the dot and dash line A—B shows schematically the high voltage generator and, to the right hand side, the fault indicating part of the circuit.

High voltage generation

A supply at 12 volts D.C. is applied to the terminals X, X and is switched alternately across two primary windings P1, P2 of a step-up transformer T. The switching is effected by transistors TR1, TR2 connected as a push-pull oscillator in which R1, R2 and C1 serve to make the operation self-starting and stable in operation. The main secondary winding S1, develops a maximum peak voltage of 10 kilovolts which is rectified by two valves V1, V2 in a voltage doubler circuit which, with capacitors C2, C3 produces a potential of 20 kilovolts D.C. when a voltage selector switch SW1, connected to two kilovolt tappings on the secondary winding of the transformer, is set to the tap having the highest voltage. Thus, the output voltage may be reduced progressively in 2 kilovolt steps to a minimum of 6 kilovolts. The last position of the switch may serve as an on/off switch.

The transformer T also has well insulated low voltage windings S2 supplying current to the heaters of the valves V1, V2, the heating being uniform irrespective of the voltages selected by the switch SW1. The circuit may also include a microammeter M1 of suitable value which may be brought into calibration by a meter resistor R3, having a nominal resistance of 600 megohms, and resistor R4. Connected to the plate of V1 is an output terminal OP to which is connected a probe or a bracelet as indicated at 13A in Figure 2.

Fault indication

Two transistors TR4 and TR5 are connected so as to constitute a relaxation oscillator whose frequency is partly determined by a capacitor C6 and the capacity and inductance of a loudspeaker LS. In the quiescent or normal state, this oscillator is rendered inoperative since the base of TR4 is maintained slightly negative through resistors R8 and R7 and also through the variable resistor RV2 this latter resistor being connected to the junction of a capacitor C4 and a rectifier MR1. These two latter components produce a negative supply of 12 volts from the alternating voltage across the transformer whilst this is in oscillation.

The voltage reaching the base of the transistor TR4 is also affected by the D.C. return from the valve V2 which means that any current from the high voltage output terminal OP via an external leakage path back to an earth connection, indicated at TE, has also to flow via the cathode of V2, through R7 and RV2, in a sense tending to drive the base of TR4 more positive. When a certain value of external leakage current flows, according to the predetermined sensitivity as set by the variable resistor RV2, a point is reached where TR4 becomes "unblocked" and TR4, TR5 oscillate to produce a loud note, at about 2000 cycles per second, in the loudspeaker. If a heavier fault current occurs, an additional transistor TR3 acts as a clamping transistor and so prevents the base of TR4 from being pulled too far positive which would stop the oscillator again.

A variable resistor RV1 serves to set this clamping level so that all leakage currents above a predetermined value produce the same loud note. Under extreme fault conditions, practically constituting a short circuit across the output terminals of the apparatus, the load on T would be so great that no high voltage D.C. would be generated with the result that the fault current would fall to zero; but under these conditions, the negative bias voltage via RV2 and R7 also disappears allowing the fault oscillator to keep running. By this means, all types of faults can be indicated, including an actual breakdown in any part of the high voltage generator.

Referring to Figures 2 and 3, the various components of the circuit may be housed in a metal container 10 which fits into a compartment 10A in a case 11. The case has a hinged lid 11A which encloses the meter, loudspeaker opening and the controls of the apparatus. The base of the case is raised in order to provide a space 11B in which are located the terminals for the attachment of an earth lead 12, which is connected to a pointed metal rod 12A for insertion in the ground. A well insulated lead 13 is connected to another terminal in the space 11B and this lead is connected in turn to a bracelet 13A which is placed around the pipe the coating of which is to be tested.

The case may have a partition 14 and a shelf 14A forming compartments 15 and 16 which serve to house the batteries (not shown) for the apparatus and also the earthing rod and high voltage lead and probe when these are not required for use. The case may have carrying harness indicated at 17.

It will be seen that the whole apparatus is self-contained

I claim:

1. Apparatus of the kind described comprising a step-up transformer, transistors connected as a push-pull oscillator for switching a low voltage supply alternately across the primary winding of the transformer, means for rectifying the high voltage across the secondary winding of the transformer, means for applying the high voltage D.C. to the coating of a pipe or the like under test, transistors connected as a relaxation oscillator, means for rendering the relaxation oscillator inoperative in the quiescent or normal state, and means whereby the relaxation oscillator may become operative to actuate indicating means when a leakage current flows through a fault in the said coating.

2. Apparatus according to claim 1 comprising a clamping transistor whereby the oscillation of the relaxation oscillator is maintained when a heavy fault current flows, and means whereby the clamping level of the said transistor may be adjusted so that all leakage currents above a predetermined value may give a uniform indication.

References Cited in the file of this patent

UNITED STATES PATENTS

| | | |
|---|---|---|
| 2,650,346 | Rasor | Aug. 25, 1953 |
| 2,812,491 | Figlio et al. | Nov. 5, 1957 |